H. F. FLEMING.
TWINE HOLDER.
APPLICATION FILED MAY 1, 1920.

1,364,987.

Patented Jan. 11, 1921.
2 SHEETS—SHEET 1.

Inventor
H. F. Fleming
By Watson E. Coleman
Attorney

H. F. FLEMING.
TWINE HOLDER.
APPLICATION FILED MAY 1, 1920.
1,364,987.
Patented Jan. 11, 1921.
2 SHEETS—SHEET 2.
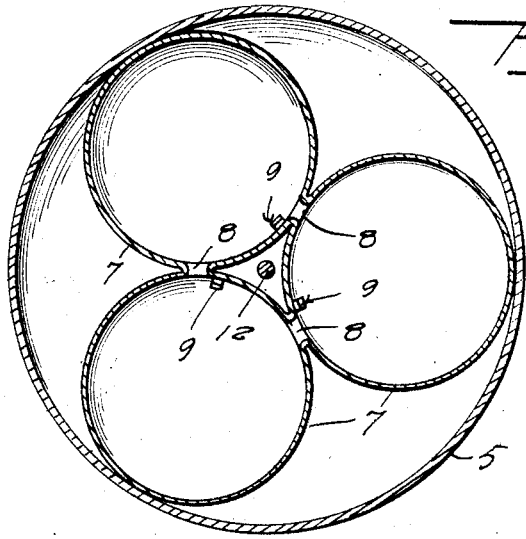
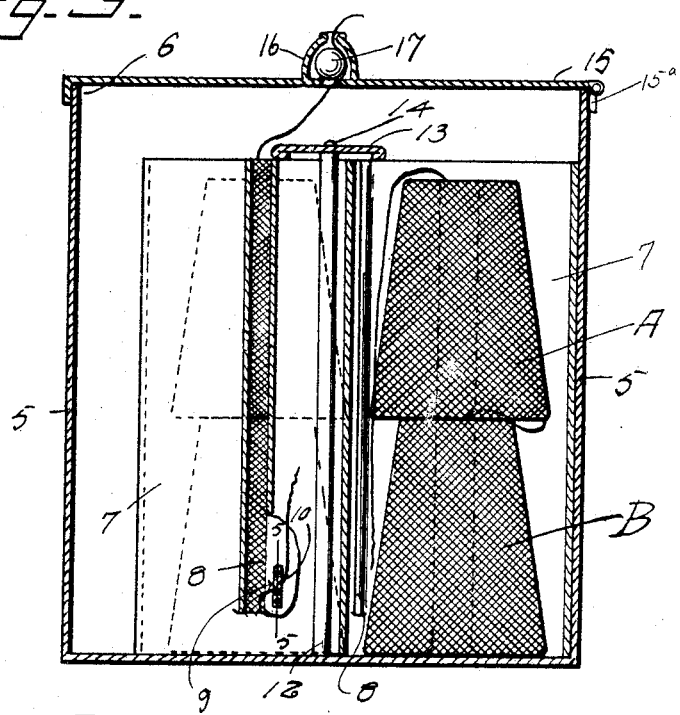
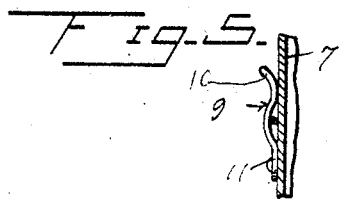
Inventor
H. F. Fleming
By Watson E. Coleman
Attorney

UNITED STATES PATENT OFFICE.

HARRY F. FLEMING, OF LORENZO, NEBRASKA.

TWINE-HOLDER.

1,364,987.   Specification of Letters Patent.   Patented Jan. 11, 1921.

Application filed May 1, 1920. Serial No. 378,252.

*To all whom it may concern:*

Be it known that I, HARRY F. FLEMING, a citizen of the United States, residing at Lorenzo, in the county of Cheyenne and State of Nebraska, have invented certain new and useful Improvements in Twine-Holders, of which the following is a specification, reference being had to the accompanying drawings.

This invention relates to twine holders and particularly to a twine holder for use on harvesters.

An object of the invention is to provide a twine holder capable of holding six or more balls of twine and so arranged that the twine feeds constantly until the entire number of balls have been exhausted.

Another object is to provide a twine holder of this character including a number of communicating compartments, the twine from one compartment being fed upwardly through the adjacent compartment to prevent tangling.

Another object is to provide a twine holder having a guide plate extending over a portion of the compartments so as to guide the twine as it is being discharged from the receptacle.

Another object is to provide a twine holder of this character wherein the empty compartment can be filled with twine without interfering with the twine being discharged from the adjacent compartment.

With these and other objects in view the invention consists in the improved construction and arrangement of parts to be hereinafter more particularly described, fully claimed and illustrated in the accompanying drawings, in which:

Fig. 2 is a transverse sectional view of the holder, the compartments being empty.

Fig. 3 is a sectional view taken on the line 3—3 of Fig. 1.

Fig. 5 is a sectional view taken on the line 5—5 of Fig. 3.

Figure 1:
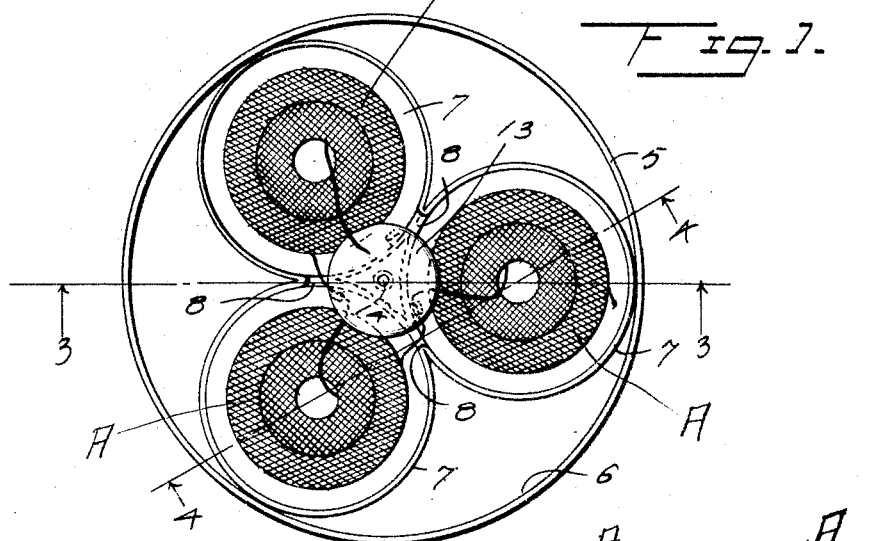
Figure 1 is a top plan view of the holder with the cover removed.
Figure 4:
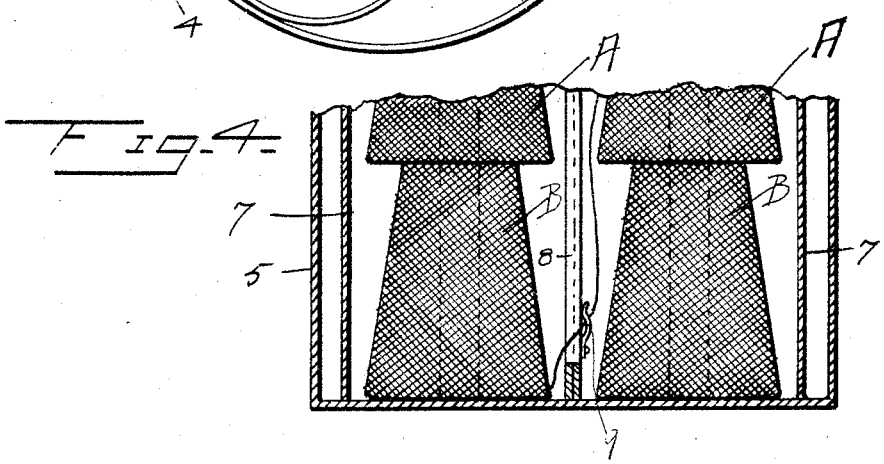
Fig. 4 is a sectional view taken on the line 4—4 of Fig. 1.

Referring to drawings, 5 designates a receptacle having an open end 6. Disposed in the receptacle is a plurality of compartments 7 preferably circular in formation. It is of course obvious that any number of compartments may be used. In the drawing three compartments are shown. Each compartment, has one portion of its wall engaging a portion of the wall of each adjacent compartment. Slots 8 are formed in each compartment, and communicate with each of the adjacent compartments, the slots terminate adjacent the bottom of each compartment and serve as discharge openings through which the twine passes. In view of the slots 8 each compartment has a twine inlet and outlet. A spring clip 9 is provided, and includes a finger piece 10 on one end and has its end 11 riveted to the interior surface of the wall of each casing closely adjacent one of the slots, and is intended to hold the portion of the twine that is to be discharged from the compartment.

Extending upwardly from the central portion of the bottom of the receptacle, between the compartments 7 is a rod 12 to which a guide plate 13 is secured as at 14. This guide plate, has its marginal edges rolled or beaded and is intended to guide the twine, the beaded portion preventing the twine from catching on the edge of the plate. The periphery of the plate or rolled edge terminates at the inner edge of the slots so as not to obstruct the passage of the twine through the slots and at the same time to guide the twine so that it will not be interfered with by the remaining portion of the twine in the compartments.

A cover 15 is provided and is hinged as at 15ᵃ or otherwise movably connected to the receptacle 5 and simultaneously closes the open ends of all of the compartments and the receptacle. This cover includes a central socket member 16 in which a tension ball 17 is disposed, to eliminate slack in the twine after it leaves the receptacle.

Figure 6:
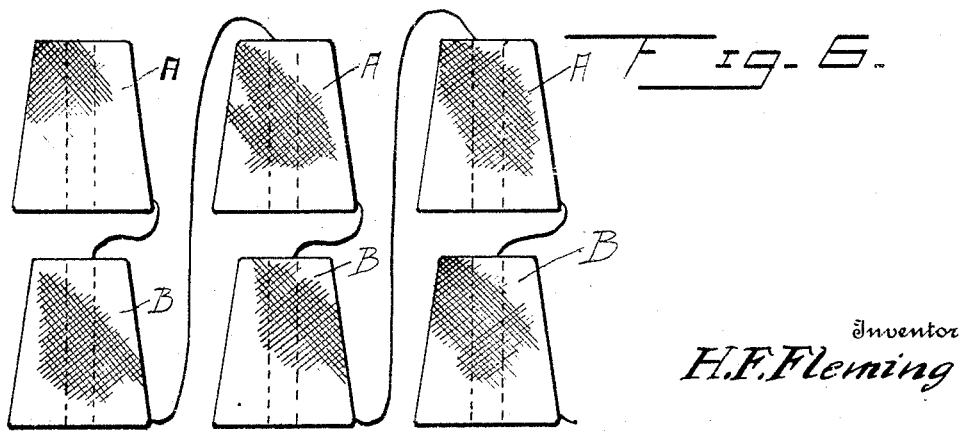
Fig. 6 is a diagrammatic view of the manner of connecting the balls of twine to each other.

The receptacle and its compartments can be constructed to hold any quantity of twine. In the present instance, two balls are provided for each compartment and are designated A and B. The balls A are disposed upon the balls B, the outside end of the twine of the ball A being connected to the inside end of the ball B. The outside end of the ball B is extended upwardly and connected to the inside end of the ball A in the next compartment as shown in Fig. 6. The twine from the ball B of one compartment is passed through the registering slots and engaged with the spring clip 9 and then upwardly in the last mentioned compartment to the ball A of said compartment and connected to the inside end of said ball as previously stated. The first ball A to be used has its inside end extended upwardly over the guide plate 13 under the tension device 17 and through the cover 15 as shown in Fig. 3.

When both balls in one compartment have been exhausted, the pull of the twine will disengage the same from the clip of the adjacent compartment and permit said length of twine to pass upwardly through the slot and thereby feed the twine from the ball A of the second compartment. This operation is continued until all the twine is exhausted. The empty compartments may be filled and attached to the balls in the adjacent compartment as in the manner above described without interfering with the ball or balls from which the twine is being fed.

It is estimated a holder of this character including three compartments will hold six balls of twine and operate constantly for half a day without refilling or attention. Furthermore, it eliminates waste of twine as it is not necessary to remove the partially exhausted ball in order to place another ball under it, but simply refill the exhausted compartments.

From the foregoing it will be readily seen that this invention provides a novel and simple form of twine holder which overcomes a great disadvantage and can be constructed to use any number of balls of twine so that unnecessary delay and waste of twine is eliminated. This twine holder is especially useful on harvesters, but may be constructed in various sizes for use in stores and like places of business.

What is claimed is:

1. A twine holder comprising a receptacle, a plurality of twine holding compartments in said receptacle, a portion of the side wall of each compartment being disposed tangential to a portion of the side wall of the adjacent compartments and having communicating slots therein, a plurality of connected balls of twine in each compartment, a portion of the twine from one of said balls extending through the slot of the compartment, and being connected to the twine in the adjacent compartment, a cover for the receptacle, said cover having an outlet common to the twine in all of the compartments, the twine in the compartments being adapted to pass through said outlet when the twine in one of the adjacent compartments has been exhausted, and means common to all of the compartments for guiding the twine to said outlet.

2. A twine holder comprising a receptacle, a plurality of twine holding compartments in said receptacle, each of said compartments having slots communicating with each of the adjacent compartments, a clip disposed in each compartment and adapted to receive a portion of the twine from one of the adjacent compartments, a plate positioned centrally of the receptacle, said plate having a beaded edge extending partially over the compartment and terminating at the slots thereof, said plate guiding the twine from the compartments, and a cover for said receptacle, said cover including an outlet through which the twine passes.

3. A twine holder comprising a receptacle, a plurality of compartments in said receptacle, each compartment having slots communicating with the adjacent compartment, a spring clip disposed in each compartment adjacent the slot, a supporting member carried by the bottom of the receptacle and extending upwardly between the compartments, a guide plate carried by said support, and a cover for said receptacle and compartments, said cover having a twine outlet, each of said compartments being arranged to hold several connected balls of twine, the twine from the bottom ball extending through the slot of its compartment into the adjacent compartment, a portion of said twine being engaged with the clip in the last mentioned compartment and connected to the top ball in the last mentioned compartment, the end portion of said twine passing over the edge of the guide plate, said twine being fed consecutively and uninterruptedly from the compartments.

In testimony whereof I hereunto affix my signature.

HARRY F. FLEMING.